UNITED STATES PATENT OFFICE.

BERTRAND B. GRUNWALD, OF ALAMEDA, CALIFORNIA, ASSIGNOR, BY MESNE ASSIGNMENTS, TO ALFRED J. MERLE, OF ALAMEDA, CALIFORNIA.

PROCESS OF PRODUCING MAGNESIUM CARBONATE.

1,298,932.     Specification of Letters Patent.     Patented Apr. 1, 1919.

No Drawing.     Application filed July 5, 1918. Serial No. 243,382.

*To all whom it may concern:*

Be it known that I, BERTRAND B. GRUNWALD, a subject of the Emperor of Austria, and a resident of Alameda, county of Alameda, and State of California, have invented a new and useful Process of Producing Magnesium Carbonate, of which the following is a specification.

The invention relates to a process of recovering magnesium carbonate from solutions containing magnesium salts.

An object of the invention is to provide a process of recovering magnesium carbonate from bitterns containing magnesium salts.

Another object of the invention is to provide a process of converting magnesium oxid or hydroxid into magnesium carbonate.

The invention possesses other advantageous features, some of which, with the foregoing, will be set forth at length in the following description where I shall outline in full, that form of the process which I have selected for description in the following specification.

The process of my invention relates to the recovery of magnesium carbonate from bitterns containing magnesium chlorid and magnesium sulfate. These bitterns may be concentrated sea water or other saline waters, or the mother liquor remaining after the extraction of sodium chlorid from sea water. In accordance with my invention I mix bittern containing magnesium chlorid and magnesium sulfate with a solution of trona $Na_2CO_3.NaHCO_3.2H_2O$. Upon mixing, reaction occurs in which the trona becomes dissociated, and the chlorid and sulfate ions are displaced by carbon dioxid, converting the magnesium salts into magnesium carbonate which is precipitated and which may be separated from the liquor in a filter of centrifuge.

To increase the yield of magnesium carbonate, the trona is first mixed with magnesium oxid or hydroxid and water. The materials may be mixed dry and the water added or the water may be added to one and then the other added. The mixture is heated and agitated, causing dissociation of the trona with liberation of carbon dioxid gas which combines with the magnesium oxid or hydroxid producing normal magnesium carbonate. The amount of magnesium oxid or hydroxid used depends upon the quantity of carbon dioxid gas that is released from the trona and I have produced satisfactory results using magnesium oxid in the proportion of from 10% to 20% of the weight of trona used.

The heated liquor containing the normal magnesium carbonate is then mixed with the bittern, with the resultant reaction between the soda carbonate and normal magnesium carbonate and the magnesium salts, and the consequent conversion of the magnesium sulfate and chlorid into basic magnesium carbonate, which precipitates and which may be removed as previously described. The yield of magnesium carbonate may further be increased by heating the mixture after the bittern is added, the increase of temperature causing the release of additional carbon dioxid gas from the trona and its combination with the magnesium oxid or hydroxid.

I claim:

1. The process of producing magnesium carbonate, comprising mixing bittern containing magnesium sulfate and magnesium chlorid with trona, whereby magnesium carbonate is precipitated.

2. The process of producing magnesium carbonate, comprising heating and agitating a water solution of trona and magnesium oxid or hydroxid, adding bittern containing magnesium sulfate and magnesium chlorid to the mixture whereby magnesium carbonate is precipitated, and separating the precipitate from the liquor.

3. The process of producing magnesium carbonate, comprising heating and agitating a water solution of trona and magnesium oxid or hydroxid, adding bittern containing magnesium sulfate and magnesium chlorid to the mixture, heating the resultant mixture and separating the precipitated magnesium carbonate from the liquor.

4. The process of producing magnesium carbonate, comprising adding a material containing sodium carbonate and sodium bicarbonate to bittern containing magnesium sulfate and magnesium chlorid, whereby carbon dioxid is released which reacts with the magnesium salts to form magnesium carbonate which precipitates.

In testimony whereof, I have hereunto set my hand at San Francisco, California, this 27th day of June 1918.

BERTRAND B. GRUNWALD.

In presence of—
H. G. PROST.